UNITED STATES PATENT OFFICE.

OTTO B. MAY, OF NEW YORK, N. Y., ASSIGNOR TO MORGENSTERN & COMPANY, OF NEW YORK, N. Y., A CORPORATION OF NEW YORK.

BISMUTH SALT OF IODIZED RESORCIN-SULFONIC ACID.

1,003,191.  Specification of Letters Patent.  Patented Sept. 12, 1911.

No Drawing.  Application filed September 23, 1910.  Serial No. 583,398.  (Specimens.)

*To all whom it may concern:*

Be it known that I, OTTO B. MAY, a subject of the Emperor of Germany, at present residing in the city of New York, borough of Manhattan, county and State of New York, have invented certain new and useful Improvements in Bismuth Salts of Iodized Resorcin-Sulfonic Acid, of which the following is a full, clear, and exact specification.

My invention relates to certain new and useful improvements in antiseptics, and especially to bismuth salts of iodized-resorcin-sulfonic acid, and also to the method of producing the same.

It has long been known that could such a product be satisfactorily prepared, it would possess extremely valuable therapeutic properties, combining the antiseptic qualities of the halogen phenolic bodies with the mechanically soothing action of the bismuth. The preparation of such a product, however, has heretofore involved apparently insuperable difficulties because of the peculiar tendency of bismuth to form unexpected and varying combinations, but by my novel methods I have been able to prepare a satisfactory product constituting a new compound possessing the desired properties which is represented in one form substantially by the formula

One method of practicing my invention is as follows:

Two hundred and sixty-five (265) grams of potassium iodo-resorcin-sulfonate are dissolved in two liters of water and to this a solution of four hundred and eighty-one (481) grams of bismuth nitrate in glycerin and water are added. To this enough of sodium bicarbonate is added for neutralization and the resulting precipitate is washed by decantation with the necessary quantity of water at a low temperature. The washed product is then dried *in vacuo*. The reaction taking place in the above-described illustrative example may be represented by the following equation:

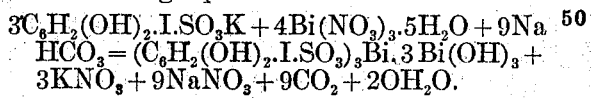

The structural formula of the product may be illustrated by the following formula:

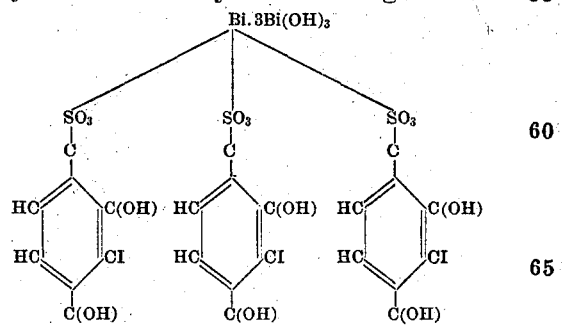

The product obtained from the foregoing or equivalent processes consists of an amorphous brownish powder and possesses the desirable properties above described.

It will be understood that various modifications may be made in the method of manufacture and in the form of my invention, for instance as to the relative proportions of iodin and bismuth present, without departing from the spirit thereof, and I do not intend to limit myself to the exact preparation or features I have described, but

What I claim and desire to secure by Letters Patent is:

1. The method of producing bismuth-iodo-resorcin-sulfonate, consisting in bringing into reaction a soluble salt of iodized resorcin-sulfonic acid and a solution of a bismuth salt, and neutralizing the mixture with a weak alkali.

2. As a new product, a bismuth salt of iodized resorcin-sulfonic acid.

3. A new antiseptic product formed from bismuth and iodized resorcin-sulfonic acid and consisting of an amorphous brownish powder, slightly hygroscopic, partly decomposable by water with the formation of bismuth hydroxid and iodo-resorcin-sulfonic acid, readily soluble with decomposition in concentrated hydrochloric acid, and upon being heated losing first iodin, then charring and finally leaving a yellow residue of bismuth oxid.

4. As a new product, a bismuth salt of iodized resorcin-sulfonic acid having substantially the formula $$(C_6H_2(OH)_2ISO_3)_3Bi.3Bi(OH)_3.$$

In witness whereof I have hereunto set my hand in the presence of two subscribing witnesses.

OTTO B. MAY.

Witnesses:
ISADORE BERNSTEIN,
ALEXANDER V. MORGENSTERN.